US005979297A

United States Patent [19]

Ricco

[11] Patent Number: 5,979,297

[45] Date of Patent: Nov. 9, 1999

[54] PERFECTED PISTON PUMP IN PARTICULAR A RADIAL-PISTON PUMP FOR INTERNAL COMBUSTION ENGINE FUEL

[75] Inventor: Mario Ricco, Bari, Italy

[73] Assignee: Elasis Sistema Ricerca Fiat Nel Mezzogiorno Societa Consortile Per Azioni, Pomigliano, Italy

[21] Appl. No.: 08/995,294

[22] Filed: Dec. 19, 1997

[30] Foreign Application Priority Data

Dec. 23, 1996 [IT] Italy ............................... TO960264 U

[51] Int. Cl.$^{6}$ ........................................................ F16J 1/10

[52] U.S. Cl. .............................. 92/129; 92/154; 417/273; 417/470

[58] Field of Search ................................ 92/12.1, 58, 72, 92/129, 153, 154; 417/273, 470

[56] References Cited

U.S. PATENT DOCUMENTS

| | | | |
|---|---|---|---|
| 4,222,714 | 9/1980 | Dantlgraber . | |
| 4,512,175 | 4/1985 | Kaku et al. . | |
| 4,673,337 | 6/1987 | Miller | 417/273 |
| 5,375,982 | 12/1994 | Joosse et al. | 417/273 |
| 5,382,140 | 1/1995 | Eisenbacher et al. | 417/273 |
| 5,571,243 | 11/1996 | Arnold et al. . | |

FOREIGN PATENT DOCUMENTS

| | | | |
|---|---|---|---|
| 4216877 | 2/1993 | Germany . | |
| 4213781 | 10/1993 | Germany . | |
| 4241825 | 6/1994 | Germany | 417/273 |
| 4241827 | 6/1994 | Germany | 417/273 |
| 4406803 | 9/1995 | Germany . | |

*Primary Examiner*—Hoang Nguyen
*Attorney, Agent, or Firm*—Reed, Smith, Shaw & McClay, LLP

[57] ABSTRACT

The pump has a number of cylinders arranged with their respective axes at a predetermined angular distance about a drive shaft; and a number of pistons, each sliding inside a respective cylinder. The inner radial end of each piston is fitted with a pad engaging a respective flat portion of a cam rotating on an eccentric portion of the drive shaft; and, to ensure against seizure, each pad has a cavity inside which is fitted a shoe having at least one layer of self-lubricating material engaging the respective flat portion of the cam.

3 Claims, 2 Drawing Sheets

PERFECTED PISTON PUMP IN PARTICULAR A RADIAL-PISTON PUMP FOR INTERNAL COMBUSTION ENGINE FUEL

BACKGROUND OF THE INVENTION

The present invention relates to a perfected piston pump, in particular a radial-piston pump for internal combustion engine fuel.

As is known, in internal combustion engines, and particularly diesel engines, pumps of the above type operate at high pressure of even over 1300 bar, and at high speed of about 3000 rpm.

The cylinders of a piston pump of the above type are arranged radially about a drive shaft comprising an eccentric portion on which rotates a cam for operating the cylinders, each of which comprises a pad engaging a respective flat portion of the cam. In use, the eccentric portion moves the cam, parallel to itself at all times, along a circular trajectory, so that each pad slides on the respective flat portion with no angular oscillation of the axis of the respective piston.

The shaft, eccentric portion, cam and pads of the pump are housed inside a closed chamber into which part of the fuel supplied to the pump is fed to lubricate the surface of the pad contacting the flat portion of the cam; and sliding bearings, also lubricated by the fuel circulating in the chamber, are provided between the shaft and respective seats, and between the cam and the eccentric portion.

Over and above a given pressure on the movable contacting surfaces and/or over and above a given speed of the pump, however, lubrication by the fuel or any type of lubricating oil is insufficient to lubricate the pad surfaces and respective flat portions of the cam. Such pressure, in fact, compresses the film of fuel or oil between the contacting surfaces, so that it is expelled from the respective gap, thus resulting in possible seizure of the two surfaces.

SUMMARY OF THE INVENTION

It is an object of the present invention to provide a highly straightforward, reliable piston pump designed to eliminate the risk of seizure between the piston pad and respective cam surface.

According to the present invention, there is provided a piston pump comprising at least one cylinder in which slides a piston; and a drive shaft in turn comprising a cam rotating on an eccentric portion integral with said shaft to activate said piston; said cam comprising a flat portion engaged by a pad integral with said piston; characterized in that, between said flat portion and said pad, there is provided an element made of self-lubricating material, for ensuring lubrication between said pad and said flat portion under any operating condition of the pump.

In a radial-piston pump comprising a number of cylinders arranged with the respective axes at a predetermined angular distance about the drive shaft, and a number of pistons, each sliding inside a respective cylinder, the radial inner end of each piston comprises a pad engaging a respective flat portion of said cam, and said element comprises a disk-shaped shoe fitted inside a cavity in each pad to engage the respective flat portion of the cam.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
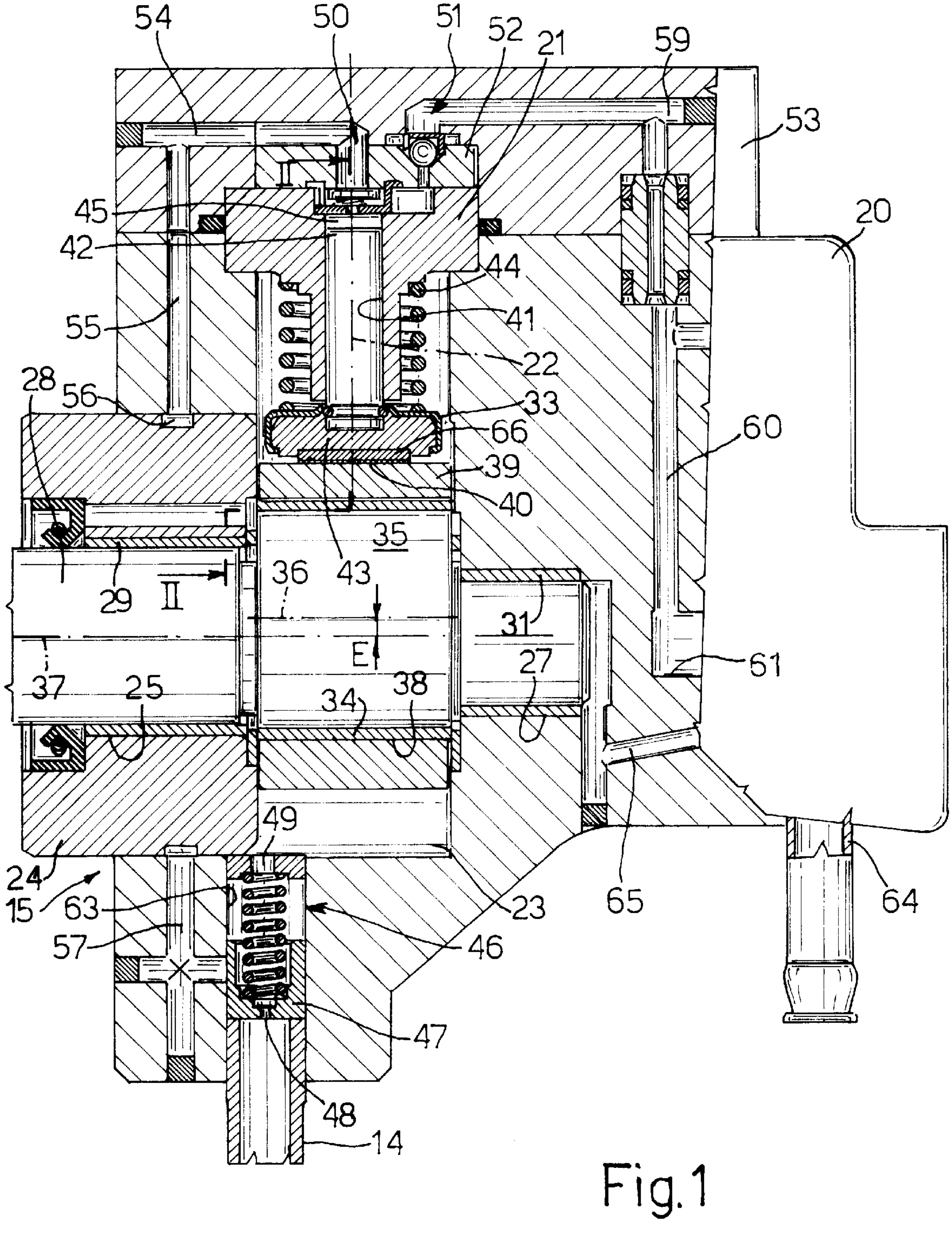
FIG. 1 shows an axial section of a radial-piston pump in accordance with the present invention.

Number 15 in FIG. 1 indicates a high-pressure radial-piston pump for supplying fuel to an internal combustion engine, e.g. a diesel engine, and comprising three cylinders 21 arranged radially inside a body 20 with their respective axes 22 separated by an angular distance of 120°. At the center, body 20 comprises a cup-shaped inner chamber 23 closed by a flange 24.

Pump 15 comprises a drive shaft 28 having two portions fitted with respective sliding bearings 29 and 31 by which shaft 28 rotates inside a hole 25 in flange 24 and inside a dead hole 27 in body 20; shaft 28 forms one piece with an eccentric portion 35 housed inside chamber 23 and fitted with a further sliding bearing 34 cooperating with the inner surface of a hole 38 of an annular cam 39 controlling pump 15, so that cam 39 rotates on eccentric portion 35; and the axis 36 of eccentric portion 35 is offset by distance E with respect to the axis 37 of shaft 28.

Figure 2:
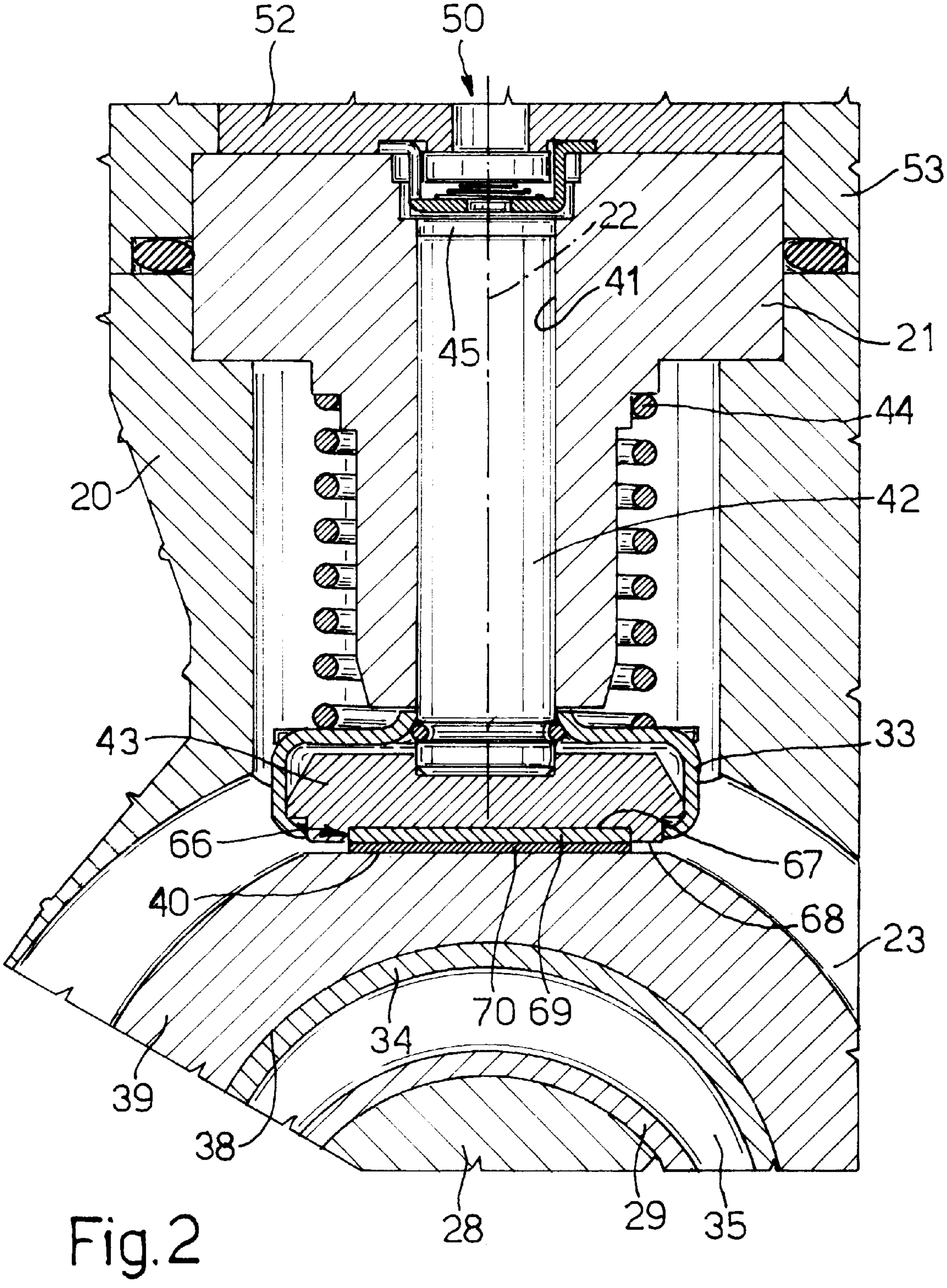
FIG. 2 shows a larger-scale partial section along line II—II in FIG. 1.

The outer surface of annular cam 39 comprises three flat portions 40 associated with cylinders 21 (only one shown in FIG. 2) and perpendicular to respective axes 22 of cylinders 21. Each cylinder 21 comprises a cylindrical hole 41 coaxial with respective axis 22, and in which slides a piston 42 projecting from cylinder 21 towards axis 37 (see also FIG. 1); and the projecting portion of each piston 42 is fitted, e.g. by means of a retainer 33, with a pad 43, which is pushed by a spring 44 towards respective flat portion 40 together with piston 42.

Since pistons 42 slide along a strictly straight trajectory, cam 39, by virtue of pads 43, maintains its orientation when shaft 28 is rotated, while axis 36 rotates about axis 37 of shaft 28, so that flat portions 40 also move parallel to themselves along a circular trajectory and, in conjunction with springs 44, move pistons 42 back and forth inside holes 41, and each pad 43 slides transversely on respective flat portion 40 of cam 39.

Inside hole 41, the surface of each piston 42 opposite cam 39 defines a compression chamber 45, the volume of which varies with the movement of piston 42; and each cylinder 21 comprises a nonreturn intake valve 50 (FIG. 1) and a nonreturn delivery valve 51, both seated in a plate 52 closing respective cylinder 21 and fitted to body 20 by a respective head 53.

As piston 42 moves radially inwards, compression chamber 45 expands and draws in fuel through intake valve 50; and, as piston 42 moves radially outwards, chamber 45 decreases in volume, so that the fuel is compressed and, on reaching a predetermined pressure, opens delivery valve 51 and is discharged out of chamber 45 through valve 51.

Each intake valve 50 is supplied with fuel along a respective axial channel 54 formed in respective head 53, and along a respective radial channel 55 formed in body 20 next to flange 24; and the three channels 55 communicate with an annular groove 56 formed in flange 24, and which in turn communicates with an intake channel 57 communicating with an inlet fitting 14.

Fuel is supplied to channel 57 via an on-off valve 46 comprising a piston 47 with a calibrated hole 48, and communicating with inner chamber 23 via a hole 49; and the fuel from inlet fitting 14 flows continually through holes 48 and 49 into chamber 23 to lubricate and cool the moving components housed inside the chamber.

Each delivery valve 51 communicates with an axial cavity 61 along a respective axial channel 59 formed in respective head 53, and along a respective radial channel 60 formed in body 20; and, downstream from a bypass valve of a pressure regulator (not shown), cavity 61 is connected to a low-pressure chamber communicating with a drain fitting 64, which is also connected in known manner to hole 27 of body 20 by a channel 65.

According to the invention, an element made of self-lubricating material, such as bronze, Teflon or similar, is provided between each flat portion 40 of cam 39 and respective pad 43. More specifically, said element comprises a disk-shaped shoe 66 housed inside a circular cavity 67 (FIG. 2) formed on the surface 68 of each pad 43 facing respective flat portion 40 of cam 39. Shoe 66 is force-fitted inside cavity 67, and is of such a thickness as to project from surface 68.

Shoe 66 may advantageously comprise a metal support 69, e.g. of steel or bronze, covered with at least one layer 70 of self-lubricating material, e.g. a known layer 70 of polytetrafluorene and lead; and shoe 66 is fitted inside cavity 67 by metal support 69 with self-lubricating layer 70 facing flat portion 40 of cam 39. In actual use, respective spring 44 keeps layer 70 resting on respective flat portion 40.

Bearings 29, 31, 34 (FIG. 1) may also comprise a metal inner support and an outer layer of self-lubricating material, preferably the same as that of shoes 66. In which case, the metal supports of bearings 29, 31, 34 are forced on to the two portions of shaft 28 and eccentric portion 35, and the self-lubricating layers cooperate with the inner surfaces of holes 25, 27 and 38.

During operation of pump 15, each shoe 66 effectively lubricates the surface of flat portion 40, even when the pressure on said surface and/or the speed of drive shaft 28 are such as to compress the film of lubricating fuel, thus eliminating any risk of seizure. Similarly, bearings 29, 31, 34 ensure effective lubrication of holes 25, 27, 38 at any pressure and any operating speed of pump 15.

As compared with the known state of the art, the pump according to the present invention therefore provides for eliminating any risk of seizure.

Clearly, changes may be made to the pump as described and illustrated herein without, however, departing from the scope of the present invention. For example, the pump may be a single-piston or in-line-piston type, and may comprise a lubricating system other than that described, e.g. an oil-bath or pressurized-oil system separate from the fuel circuit.

Moreover, shoe 66 may be other than circular; shoe 66 and/or bearings 29, 31, 34 may comprise a number of self-lubricating layers other than that described; shoe 66 may be fitted to respective flat portion 40 of cam 39; and, finally, shoe 66 may be fitted to pad 43 or to flat portion 40 in any other manner, e.g. screwed, welded or bonded.

What is claimed is:

1. A piston pump comprising a number of cylinders arranged with respective axes at a predetermined angular distance about a drive shaft; and a number of pistons, each sliding inside a respective cylinder of said number; the radial inner end of each said piston being secured to a respective pad; said drive shaft being integral with an eccentric portion; and an annular cam inside which rotates said eccentric portion, said annular cam comprising a number of flat portions each one associated with the respective said pads, each said pad facing the associated flat portion and being urged by a respective spring toward said associated flat portion, whereby upon rotation of said eccentric inside said annular cam each said pad has a sliding movement in respect to said associated flat portion; wherein the improvement includes a circular cavity formed in each said pad, and disk-shaped shoe comprising a support of metal material covered with at least one layer of self lubricating material comprising poytetrafluorene and lead, said shoe being force-fitted inside said cavity by said support to enable said layer to face said flat portion, said layer being maintained elastically in contact with said flat portion by said respective spring.

2. A pump as claimed in claim 1 wherein said shoe is screwed, welded or bonded to said pad or to said flat portion.

3. A pump as claimed in claim 1, in particular a high-pressure type for internal combustion engine fuel, comprising a body having a closed chamber housing said cam and said pads, and into which fuel is fed to lubricate said shaft and said cam wherein said shaft and said eccentric portion each comprise a sliding bearing in turn comprising a metal support and at least one layer of self-lubricating material.

* * * * *